(12) United States Patent
Fry

(10) Patent No.: US 7,502,996 B2
(45) Date of Patent: Mar. 10, 2009

(54) SYSTEM AND METHOD FOR FAST XSL TRANSFORMATION

(75) Inventor: Chris Fry, Berkeley, CA (US)

(73) Assignee: Bea Systems, Inc., Redwood Shores, CA (US)

( * ) Notice: Subject to any disclaimer, the term of this patent is extended or adjusted under 35 U.S.C. 154(b) by 471 days.

(21) Appl. No.: 10/304,233

(22) Filed: Nov. 26, 2002

(65) Prior Publication Data

US 2003/0159111 A1 Aug. 21, 2003

Related U.S. Application Data

(60) Provisional application No. 60/358,421, filed on Feb. 21, 2002.

(51) Int. Cl.
G06F 17/00 (2006.01)

(52) U.S. Cl. .................. 715/236; 715/239; 715/249

(58) Field of Classification Search ............ 715/513, 715/523, 236, 239, 249; 709/226
See application file for complete search history.

(56) References Cited

U.S. PATENT DOCUMENTS

| 6,012,098 | A * | 1/2000 | Bayeh et al. ............... 709/246 |
| 6,125,391 | A | 9/2000 | Meltzer et al. |
| 6,226,675 | B1 | 5/2001 | Meltzer et al. ............ 709/223 |
| 6,438,744 | B2 | 8/2002 | Toutonghi et al. |
| 6,516,322 | B1 | 2/2003 | Meredith |
| 6,519,617 | B1 | 2/2003 | Wanderski et al. ........ 715/513 |
| 6,621,505 | B1 | 9/2003 | Beauchamp et al. |
| 6,901,410 | B2 | 5/2005 | Marron et al. .......... 707/104.1 |
| 2001/0056504 | A1 | 12/2001 | Kuznetsov |
| 2002/0049603 | A1 | 4/2002 | Mehra et al. |
| 2002/0073399 | A1 | 6/2002 | Golden |
| 2002/0085020 | A1 | 7/2002 | Carroll, Jr. |
| 2002/0111963 | A1 | 8/2002 | Gebert et al. |
| 2002/0122054 | A1 | 9/2002 | Hind et al. |
| 2002/0143815 | A1 | 10/2002 | Sather et al. |
| 2002/0165872 | A1 | 11/2002 | Meltzer et al. |
| 2002/0184145 | A1 | 12/2002 | Sajacic et al. |
| 2003/0005410 | A1 | 1/2003 | Harless |
| 2003/0018661 | A1 | 1/2003 | Daraugar |
| 2003/0055875 | A1 | 3/2003 | Carter |
| 2003/0065874 | A1 | 4/2003 | Marron et al. |

(Continued)

OTHER PUBLICATIONS

"COM+ Technical Series: Object Pooling" Aug. 1999, http://msdn.microsoft.com/library/default.asp?url=/library/en-us/dncomser/html/complusobjpool.asp.*

(Continued)

Primary Examiner—Stephen S Hong
Assistant Examiner—Adam M Queler
(74) Attorney, Agent, or Firm—Fliesler Meyer LLP

(57) ABSTRACT

Improved XML transformation is obtained through the combined use of caching and pooling. A transformer caching pool can cache transformers to server client transformation requests. A transformer resource manager can select any appropriate transformer from the transformer caching pool. Once an appropriate transformer is selected, the resource manager can mark the transformer as busy and return it to the client. If a transformer is not available, the transformer resource manager can contact a transformer creator to create a new transformer and can then place the new transformer in the transformer caching pool. The new transformer can then be marked as busy and returned to the client to serve the transformation request.

11 Claims, 2 Drawing Sheets

U.S. PATENT DOCUMENTS

2003/0217094 A1 11/2003 Andrews et al.
2004/0103373 A1 5/2004 Wei

OTHER PUBLICATIONS

Provost, "How Caching Works," archived Oct. 1, 1999, http://www.howstuffworks.com/cache.htm.*

Monson-Haefel, "Enteprise JavaBeans" Sep. 2001, O'Reily, 3rd Edition, Safari Books Online, Chapter 11.5.*

Pemburton et al., XHTML™ 1.0: The Extensible HyperText Markup Language, A Reformulation of HTML 4.0 in XML 1.0, W3C Working Draft May 5, 1999 http://www.w3.org/TR/1999/xhtml1-19990505/.*

"What is Server-Side" Archived Dec. 1, 2002 http://www.webopedia.com/TERM/s/server_side.html.*

"Dedicated Server Glossary" Archived Dec. 15, 2001 http://www.webserverlist.com/guides/glossary.asp.*

Cover, Early Access Release of Java Architecture for XML Binding (JAXB), Jun. 14, 2001, p. 1-2.

Cerami, "Web Services Essentials", 2001, pp. 1-32.

Curley "Converting Java and CORBA Components to a WS Reprentation", Feb. 6, 2002, pp. 1-12.

Adak et al., "Adaptive XML/Java Data-Binding", May 2001, pp. 1-11.

Sunsted, "Web Services Distilled: Essential Guidance for Today's Web Services", Aug. 17, 2001, pp. 1-6.

Abraham, "TopXML", Feb. 11, 2002, pp. 1-4.

Cover Pages, "Sun Microsystems Announces Java Architecture for XML Binding Beta Implementation", Oct. 24, 2002, pp. 1-5.

* cited by examiner

SYSTEM AND METHOD FOR FAST XSL TRANSFORMATION

CLAIM OF PRIORITY

This application claims priority to U.S. Provisional Patent Application No. 60/358,421, filed Feb. 21, 2002, entitled "SYSTEM AND METHOD FOR FAST XSL TRANSFORMATION", which is hereby incorporated herein by reference.

CROSS-REFERENCED CASES

The following applications are cross-referenced and incorporated herein by reference:

U.S. patent application Ser. No. 10/304,353 entitled "SYSTEM AND METHOD FOR XML DATA BINDING" by Chris Fry and Scott Ziegler, filed Nov. 26, 2002.

U.S. patent application Ser. No. 10/304,353 entitled "SYSTEM AND METHOD FOR XML PARSING" by Chris Fry, filed Nov. 26, 2002.

U.S. patent application Ser. No. 10/304,207 entitled "STREAMING PARSER API" by Chris Fry and Sam Pullara, filed Nov. 26, 2002.

FIELD OF THE INVENTION

The present invention relates to the transformation of XML documents.

BACKGROUND

The growing use of web services and XML as a main source of web content has brought about the need for high levels of XSLT performance in concurrent environments. Certain syntax and semantics define templates that can be used with the Extensible Stylesheet Language (XSL), a stylesheet language for XML. These XSL templates, known collectively as XSLT, comprise a language for transforming XML documents between XML formats. In addition to XSLT, XSL includes a vocabulary for specifying XML formats. XSL can specify the style of an XML document by using XSLT. XSLT can describe how one XML document is transformed into another that uses the formatting vocabulary. XSLT can also be used independent of XSL. XSLT is not intended as a general-purpose XML transformation language, but is designed for transformations that are needed when XSLT is used as part of XSL.

A transformation in the XSLT language is expressed as a well-formed, conforming XML document. This can include both elements that are defined by XSLT and elements that are not defined by XSLT. XSLT-defined elements belong to a specific XML namespace, which can be referred to as an XSLT namespace.

A transformation expressed in XSLT can describe rules for transforming a source tree into a result tree. This transformation can be achieved by associating patterns with templates. A pattern can then be matched against elements in the source tree. A template is instantiated to create part of the result tree. The structure of the result tree can be different than that of the source tree. In constructing the result tree, elements from the source tree can be filtered and reordered into an arbitrary structure. A transformation expressed in XSLT is called a stylesheet, as the transformation functions as a stylesheet when XSLT is transforming into the XSL formatting vocabulary.

A stylesheet contains a set of template rules, with each template rule having two parts. One part is a pattern that is matched against nodes in the source tree, and the other part is a template that can be instantiated to form part of the result tree. This two-part approach allows a stylesheet to be applicable to a wide class of documents that have similar source tree structures.

A template is instantiated for a particular source element to create part of the result tree. The template can contain elements that specify literal result element structure, and can contain elements from the XSLT namespace. These elements can comprise instructions for creating result tree fragments. When a template is instantiated, each instruction is executed and replaced by the result tree fragment that it creates. Instructions can select and process descendant source elements. Processing a descendant element can create a result tree fragment by finding the applicable template rule and instantiating its template. Elements are only processed when they are selected by the execution of an instruction. The result tree is constructed by finding the template rule for the root node and instantiating its template. In the process of finding the applicable template rule, more than one template rule can have a pattern that matches a given element. However, only one template rule can be applied.

A single template can create structures of arbitrary complexity. A template can pull string values from arbitrary locations in the source tree. The template can generate structures that are repeated according to the occurrence of elements in the source tree. For simple transformations where the structure of the result tree does not depend on the structure of the source tree, a stylesheet can consist of a single template, which functions as a template for the complete result tree. Transformations on XML documents that represent data are often of this kind. XSLT allows a simplified syntax for such stylesheets.

A template is instantiated with respect to a current node and a current node list. Many XSLT operations are relative to the current node. During the instantiation of one of these instructions, the current node list can change to a new list of nodes and each member of this new list can sequentially become the current node. After the instantiation is complete, the current node and current node list revert to their pre-instantiated state.

Transformations for legacy systems can include XML data to be transformed, an XSL stylesheet, and an XSL transformer. Input data and a stylesheet are read into memory, parsed, and transformed into output XML data. While input XML data is highly volatile, XSL stylesheets can be stable in the production environment. This makes processing of XSL stylesheets a subject for optimization. Certain approaches can be used to improve the performance of a legacy XSLT. One approach is to read and keep an XSL stylesheet in memory for subsequent reuse. This approach reduces the input/output time necessary to get a stylesheet from the source. The source can be a file or a generic stream.

Preliminary parsing of a stylesheet can be placed into a tree for subsequent reuse. This saves time by avoiding the repetition of parsing by a transformer. For compiled stylesheets, a stylesheet can be compiled to Java bytecode which then performs a transformation. This can be a fast means of transportation. Modern XSL transformers, including Apache XALAN, offer ways to implement these optimization techniques. This optimization approach works fine for single user environments, but heavy-loaded server side applications and servers themselves add requirements for concurrent processing but do not wish to compromise throughput.

BRIEF SUMMARY

It is therefore desirable to improve the quality of both development and deployment of applications which user XSLT.

It is further desirable to improve the performance of XSLT through concurrent XSLT processing.

It is further desirable to improve manageability through runtime access of XSLT performance metrics and XSLT monitoring.

It is further desirable to provide a level of abstraction enough to isolate details of the implementation so that different optimization algorithms can be switched interchangeably.

It is further desirable to take into account possible requirements for run-time algorithm switching or pluggability.

It is further desirable to utilize JAXP 1.1 in one embodiment.

A system and method for improved XML transformation utilizes a transformer caching pool for caching transformers. A transformer resource manager can select any transformer from a transformer caching pool that is appropriate to serve a transformation request from a client. Once an appropriate transformer is selected, the resource manager can mark the transformer as busy and return it to the client. A transformer resource manager can determine whether a transformer is available in the transformer caching pool. If none is available, the transformer resource manager can contact a transformer creator, which can be stored in a transformer creator pool, to create a new transformer and can then place the new transformer in the transformer caching pool. The new transformer can then be marked as busy and returned to the client to serve the transformation request.

Other features, aspects, and objects of the invention can be obtained from a review of the specification, the figures, and the claims.

DETAILED DESCRIPTION

Figure 1:
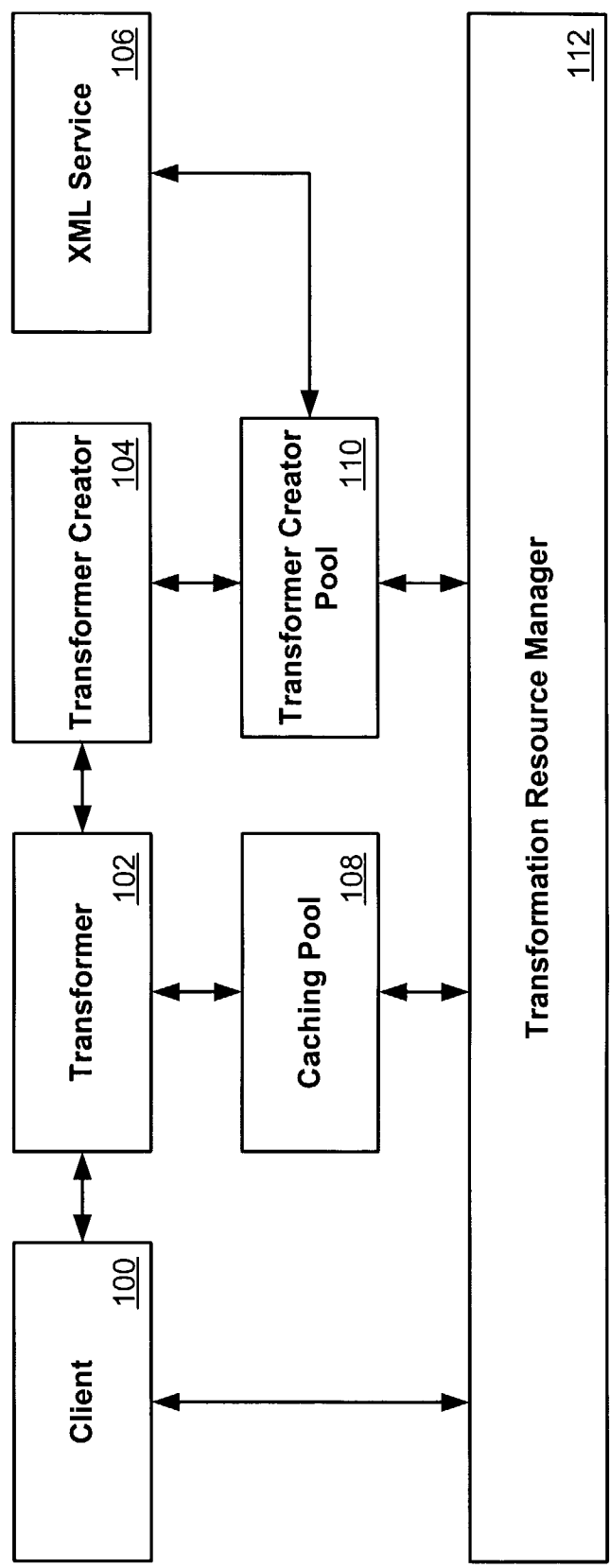
FIG. 1 is a diagram of a system in accordance with one embodiment of the present invention.

The requirement for fast server-side XSLT processing can be satisfied by applying a combination of caching techniques with a pool of reusable XSLT objects. One such system and method in accordance with an embodiment of the present invention can have four primary components or classes. These components can include an XML source, an XSL source, a transformer, and an XML result.

An XML source, or XML Source class, can contain XML data that has not yet been transformed. An XSL source, or XSLSource class, can contain XML data that describes the transformation to be used on the data in the XML source. A transformation processor, or transformer, can be responsible for the transformation itself. An XML result, or XMLResult class, can contain XML data that results from the transformation. The transformation processor can transform the XML source into an XML result using a stylesheet.

A transformation processor can avoid the repeated preliminary processing of stylesheets. When a transformation processor receives a request for transformation from a client, the transformation processor can check cache to see if a prepared stylesheet already exists. If a prepared stylesheet exists, the transformation processor can use this stylesheet for the transformation. If a prepared stylesheet does not exist, the transformation processor can prepare a new stylesheet, use the stylesheet for the transformation, then place it into the cache for possible reuse.

A prepared stylesheet can store information that allows for repeated use by a transformation processor without repeated preparation. A prepared stylesheet cache can serve as storage for prepared stylesheets, allowing for fast retrieval of a prepared stylesheet upon request of the transformation processor. A transformation processor can request a prepared stylesheet cache for a prepared stylesheet. The transformation processor can put new prepared stylesheets into a prepared stylesheet cache that can hold the prepared stylesheets.

High concurrency and throughput can be obtained by shifting processing responsibility to the requestor side. A client can make a request for a transformer, such as an object that can make transformations for a concrete stylesheet. A transformation resource manager can attempt to find an available object in a cache of transformers. If the transformation resource manager finds an associated object, the manager can return the object to the client and can mark the object as 'busy' or 'unavailable'. If the transformation resource manager cannot find an appropriate transformer or all transformers are busy, the transformation resource manager can create another transformer, place it into the pool, mark it as busy, and return it to the client.

A pool of pre-existing or previously-created transformer creators can be utilized. A member of this pool can use these transformer creators to create a transformer. A client can then use this transformer and return the transformer to the pool for another request. This schema is combination of pooling and caching.

FIG. 1 shows an overview of a system that can be used in accordance with one embodiment of the present invention. A client 100 makes a request for a transformer 102, that is received by a transformation resource manager 112. A transformer is an object that can perform transformations, such as are associated with a concrete stylesheet. The transformation resource manager 112, which can be used to control any available transformation resources, can attempt to find an available transformer 102 in a caching pool 108, which can serve as storage for any transformation objects and their respective states. If an appropriate transformer 102 does not exist, or is not available, the resource manager 112 can check a transformer creator pool 110 to determine whether a transformer creator 104 is available. If a transformer creator 104 is available, the resource manager 112 can use the creator 104 to create a transformer 102, which can be placed into the caching pool 108, marked as busy, and returned to the client 100. An XML service 106 can be used to initialize the transformer creator pool 110 if necessary, such as at during server startup.

A system can also configure and monitor an XSL transformation service. Such a system can support at least a minimum configuration parameter set. Monitoring can provide runtime information about performance and state metrics. This functionality can be arrived at through the use of configuration and runtime MBeans.

Figure 2:
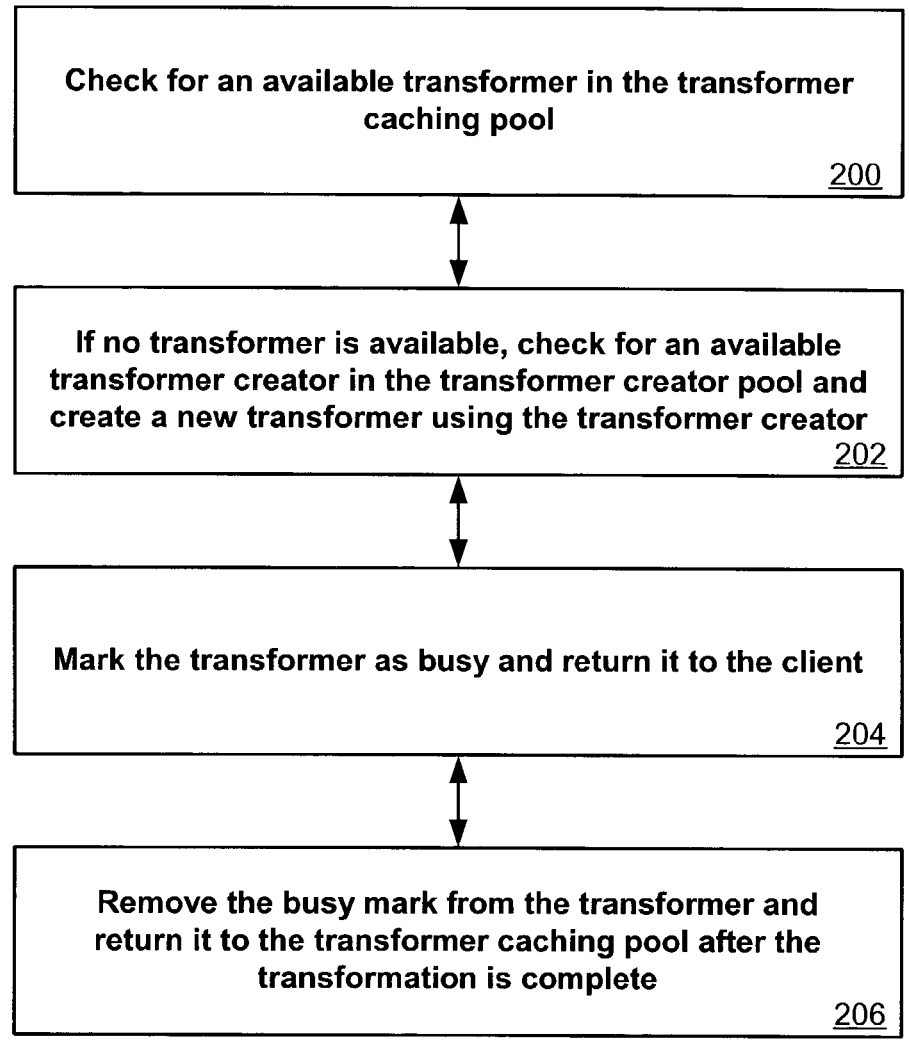
FIG. 2 is a flowchart showing the steps of a method that can be used with the system of FIG. 1.

FIG. 2 shows a method that can be used in accordance with the system of FIG. 1. When a client request is received for a transformer, such as to a transformer processor or transformer resource manager, the system checks to see if an appropriate transformer is available in the transformer caching pool 200. If no transformer is available, the system checks for a transformer creator in the transformer creator pool, and uses this transformer creator to create a new transformer for use in the transformation 202. The transformer to be used for the transformation is marked as busy and returned to the client 204. After the transformation is complete, the busy mark is removed from the transformer, or the transformer is marked as available, and the transformer is returned to the transformer caching pool for subsequent use 206.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A computer implemented system for XML transformation comprising:
   a multi-layer object caching pool framework that includes:
      a transformer caching pool to cache a plurality of transformers, wherein each transformer operable to transform an XML source to an XML result based on a plurality of XSL sources that describe a transformation to be used on a data in the XML source;
      a transformer creator pool to cache at least one transformer creator, wherein each transformer creator operates to create the transformer based on the plurality of XSL sources to be cached in said transformer caching pool; and
      an XML Service to initialize the transformer creator pool; and
   a transformer resource manager capable of:
      selecting the transformer from the transformer caching pool to serve a request for transformation if the transformer is available;
      determining whether the transformer is available in said transformer caching pool;
      checking for an appropriate transformer creator in the transformer creator pool; and
      creating the transformer using the transformer creator if the transformer is not available in said transformer caching pool,
   wherein the transformer resource manager resides on one or more memories.

2. A system according to claim 1, further comprising a transformation processor capable of carrying out the XML transformation using the transformer selected by said transformer resource manager.

3. A system according to claim 1, further comprising a stylesheet to be used by a transformer selected by said transformer resource manager for the XML transformation.

4. A system according to claim 3, further comprising a stylesheet cache for storing said stylesheet.

5. A system according to claim 1, wherein said transformer resource manager is further capable placing the transformer in the transformer caching pool.

6. A method for XML transformation comprising:
   providing an XML Service to initialize the transformer creator pool;
   selecting a transformer creator from a transformer creator pool;
   creating the transformer using a transformer creator when there is no available transformer in the transformer caching pool;
   selecting a transformer from a transformer caching pool in response to a request for transformation from a client if the transformer is available, wherein the transformer caching pool caches a plurality of transformers, each of the transformers based one of a plurality of XSL sources;
   marking the transformer as busy;
   returning the transformer to the client making the request; and
   utilizing the transformer to transform an XML source to an XML result based on a plurality of XSL sources that describe a transformation to be used on a data in the XML source.

7. A method according to claim 6, further comprising:
   requesting the transformer from a transformation resource manager.

8. A method according to claim 6, further comprising:
   utilizing an existing stylesheet for the transformation.

9. A method according to claim 8, further comprising:
   checking a stylesheet cache to determine whether a stylesheet already exists.

10. A method according to claim 9, further comprising:
    creating a new stylesheet for the transformation and placing the new stylesheet in the stylesheet cache.

11. A method according to claim 6, further comprising:
    placing the transformer in the transformer caching pool.

* * * * *

UNITED STATES PATENT AND TRADEMARK OFFICE
CERTIFICATE OF CORRECTION

| | | |
|---|---|---|
| PATENT NO. | : 7,502,996 B2 | Page 1 of 1 |
| APPLICATION NO. | : 10/304233 | |
| DATED | : March 10, 2009 | |
| INVENTOR(S) | : Fry | |

It is certified that error appears in the above-identified patent and that said Letters Patent is hereby corrected as shown below:

On Title page, in Item (56), in column 1, under "U.S. Patent Documents", line 2, after "Meltzer et al." insert -- 709/223 --.

On page 2, in column 1, under "Other Publications", line 3, delete "Enteprise" and insert -- Enterprise --, therefor.

On page 2, in column 2, under "Other Publications", line 7, delete "Reprentation" and insert -- Representation --, therefor.

In column 1, line 18, under "Cross-Referenced Cases," delete "10/304,353" and insert -- 10/304,280 --, therefor.

In column 6, line 11, in claim 5, after "capable" insert -- of --.

In column 6, line 25, in claim 6, after "based" insert -- on --.

Signed and Sealed this

Eighteenth Day of May, 2010

David J. Kappos
*Director of the United States Patent and Trademark Office*